United States Patent
Goerenz et al.

(10) Patent No.: US 7,056,586 B2
(45) Date of Patent: Jun. 6, 2006

(54) LAMINATED GLAZING UNIT AND A PROCESS FOR MANUFACTURING THEREOF WITH A CORROSION-PROTECTED TRANSPARENT SURFACE COATING

(75) Inventors: Walter Goerenz, Alsdorf (DE); Ullrich Billert, Aachen (DE); Dieter Linnhöfer, Stolberg (DE); Walter Nievelstein, Landgraaf (NL); Rolf Van Der Meulen, Herzogenrath (DE); Volkmar Offermann, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 554 days.

(21) Appl. No.: 09/851,159

(22) Filed: May 9, 2001

(65) Prior Publication Data
US 2002/0003019 A1  Jan. 10, 2002

(30) Foreign Application Priority Data
May 9, 2000  (DE) ............................... 100 22 409

(51) Int. Cl.
*B32B 17/06* (2006.01)
(52) U.S. Cl. ...................... 428/432; 156/101; 156/106; 156/153
(58) Field of Classification Search ................ 156/101, 156/102, 106, 153; 428/622–623, 432–433, 428/38; 65/60.1, 60.3, 60.2, 60.4, 60.5, 60.51, 65/60.52, 60.53, 60.7, 61, 102; 219/203, 219/543; 427/96, 125, 126.2, 126.5, 284
See application file for complete search history.

(56) References Cited

U.S. PATENT DOCUMENTS

| | | | |
|---|---|---|---|
| 4,994,650 A | * | 2/1991 | Koontz ........................ 219/497 |
| 5,030,503 A | * | 7/1991 | Carter et al. ................ 428/195 |
| 5,099,105 A | | 3/1992 | Goerenz et al. ............. 219/203 |

(Continued)

FOREIGN PATENT DOCUMENTS

DE   2344616 A1 * 6/1975

(Continued)

OTHER PUBLICATIONS

English translation of DE 2344616.*

(Continued)

*Primary Examiner*—Jessica Rossi
(74) *Attorney, Agent, or Firm*—Oblon, Spivak, McClelland, Maier & Neustadt, P.C.

(57) ABSTRACT

The invention relates to a process for manufacturing a laminated glazing unit including of at least two transparent panes, one of which is provided on its surface facing the inside of the composite with a corrosion-protected transparent surface coating. The panes are joined together by layers of adhesive. The transparent surface coating is removed along at least one edge of the coated pane in a region between 0.1 mm and 5 mm from the peripheral edge of the pane in the direction of the main surface of the pane, and a protective layer impermeable to the diffusion of water vapor, covering the external boundary edge of the transparent surface coating, is applied along that edge of the coated pane from which the coating has been removed. The invention also relates to a laminated glazing unit with a corrosion-protected transparent surface coating.

21 Claims, 1 Drawing Sheet

U.S. PATENT DOCUMENTS

| | | | |
|---|---|---|---|
| 5,131,967 A | 7/1992 | Tweadey, II et al. | 156/101 |
| 5,320,893 A * | 6/1994 | Floyd | 428/136 |
| 5,334,412 A * | 8/1994 | Korn et al. | 427/108 |
| 5,908,675 A * | 6/1999 | Marquardt et al. | 428/34 |
| 5,980,666 A | 11/1999 | Roth et al. | 156/107 |
| 5,999,136 A * | 12/1999 | Winter et al. | 343/713 |
| 6,555,202 B1 * | 4/2003 | Shukuri et al. | 428/156 |

FOREIGN PATENT DOCUMENTS

| | | |
|---|---|---|
| DE | 39 12512 A1 | 10/1990 |
| DE | 195 03 510 A1 | 8/1996 |
| DE | 196 32 240 A1 | 11/1997 |

OTHER PUBLICATIONS

English translation of DE 19632240.*

* cited by examiner

LAMINATED GLAZING UNIT AND A PROCESS FOR MANUFACTURING THEREOF WITH A CORROSION-PROTECTED TRANSPARENT SURFACE COATING

FIELD OF THE INVENTION

The invention relates to a process for manufacturing a laminated glazing unit provided with a corrosion-protected transparent surface coating. The invention also relates to laminated glazing units obtained with this process.

BACKGROUND OF THE INVENTION

Laminated glazing units provided with a transparent surface coating on one of the panes are often used in motor-vehicle construction and in architecture. In this case, the term "transparent" relates to the visible spectral range of light. The transparent surface coating serves for surface electrical heating or as a reflecting layer for a defined electromagnetic radiation spectrum, e.g., infrared radiation. In addition, the transparent surface coating is generally designed both as an electrically conducting multilayer film system using silver and as a functional layer and stop and antireflection dielectric layers. However, other constructions of layers are known. Since the thin film systems of the type mentioned are not generally corrosion resistant, they are included on the inside of a composite formed from glass and/or plastic panes. After inclusion of the film systems in a composite, though, a problem may arise because of the appearance of corrosion of the thin conducting layer at the peripheral edge of the laminated panes.

It is known from U.S. Pat. No. 5,131,967 to reduce the corrosion at the edge of a glass pane by removing the surface coating applied along its edge using a laser beam. The region removed has a width of about 0.025 mm to 3.2 mm. In this case, a line of separation may simply be produced in the surface coating at a short distance from the edge of the glass pane, or the layer of a peripheral region of the surface coating may be completely removed along the perimeter of the glass pane. The region stripped of the coating by laser treatment serves as a barrier, stopping the advance of corrosion which starts from the peripheral edge. During subsequent assembly of the glass panes using a film of adhesive, the surface included within the line of separation or the reduced surface at the edge is covered and sealed by the adhesive film, and thus protected from the environment.

Another solution to a problem that arises in a similar manner during manufacture of a glazing unit that is made of infrared-reflecting laminated glass of two individual glass panes is proposed in DE 195 03 510 A1. In the case of the laminated glazing unit described in that document, the infrared-reflecting layer does not lie on an individual pane, but instead on an additional carrier film. This carrier film is joined to two coating layers made of a thermoplastic in order to form the adhesive film which joins the two individual glass panes together. A flat piece corresponding to the shape of the glass panes, but smaller by a few millimeters, is cut out from the adhesive film at the edge. A precomposite is created from the flat piece of adhesive film and two glass panes that enclose it by removing the air between the adhesive film and the glass panes. A peripheral lateral slot remains between the glass panes and the peripheral edge of the adhesive film, and this lateral slot in the precomposite is filled by injecting, in a melt, the same thermoplastic as that of the coating layers of the adhesive films. The final assembly of the layers is then carried out during an autoclaving procedure.

The two aforementioned processes are effective but relatively expensive, since special plants such as a laser treatment station or an extruder must be available for the steps of the corrosion protection process. This machinery also is not usually available in the manufacture of laminated glazing units.

Despite these processes, there is a need for another process that is better suited to industrial manufacture of a laminated glazing unit provided with a corrosion-protected transparent surface coating. There also is a need for corrosion-protected laminated glazing units obtained according to such a process

SUMMARY OF THE INVENTION

The present invention is related to a process for manufacturing a laminated glazing unit having at least two panes that form a composite with an inside and an outside, a first coated pane being provided on a surface facing the inside of the composite with a corrosion-protected transparent surface coating and at least one adhesive layer for coupling the panes together. The process includes: removing the transparent surface coating proximate at least one edge of the coated pane to expose a region between about 0.1 mm and about 5 mm from a peripheral edge of the pane along a main surface of the pane; applying a protective layer proximate the peripheral edge of the coated pane after removal of the transparent surface coating therefrom, the protective layer being substantially impermeable to diffusion of water vapor and covering at least a portion of the exposed region of the coated pane and an external boundary edge of the transparent surface coating; and coupling the panes together with an adhesive layer disposed therebetween to form the laminated glazing unit. The process may further include baking the ceramic paint, with at least one of the panes including the coated pane being formed of glass.

The transparent surface coating may be removed along the edge of the coated pane by abrasion, and the abrasion treatment may occur substantially simultaneously with a grinding treatment for grinding the peripheral edge. The protective layer covering the external boundary edge of the transparent surface coating may be an organic coating. In some embodiments, the transparent surface coating may be a bakable ceramic paint.

The protective layer may cover substantially the entire main surface of the coated pane that is provided with the transparent surface coating. Furthermore, the protective layer covering the external boundary edge of the transparent surface coating may be in the form of a frame that is opaque and decorative. At least one of the panes may be curved glass formed by bending, the curved glass being provided with the transparent surface coating prior to bending.

The present invention also is related to a laminated glazing unit including at least two panes coupled together by an adhesive layer disposed therebetween to form a composite with an inside and an outside. A first coated pane is provided on a surface facing the inside of the composite with a transparent surface coating; however, the transparent surface coating is removed proximate at least one edge of the coated pane in a region between about 0.1 mm and about 5 mm from a peripheral edge of the pane along a main surface of the pane. A transition region extends between coated and uncoated regions of the main surface and is covered with a protective layer impermeable to diffusion of water vapor.

The protective layer may be disposed at an angle of between about 180° and about 190° in the transition region extending between coated and uncoated regions of the main surface. The protective layer may be formed of a bakable paint that is electrically conducting. In some embodiments, the transparent surface coating includes at least one of silver and an antireflection dielectric. A silver layer may abut an antireflection dielectric layer. The adhesive layer may be a synthetic thermoplastic.

The present invention further relates to a process for manufacturing a laminated glazing unit having at least two panes forming a composite with an inside and an outside, the process including: applying a transparent surface coating to a first pane along substantially an entire main surface facing the inside of the composite; removing the transparent surface coating proximate at least one peripheral edge of the first pane to expose the main surface of the pane; applying a protective coating proximate the peripheral edge of the first pane after removal of the transparent surface coating therefrom, the protective coating being substantially impermeable to diffusion of water vapor and covering at least a portion of the exposed main surface of the first pane and a boundary edge of the transparent surface coating; and bonding the panes together to form the laminated glazing unit. The process may also include bending at least one pane, and the panes may be adhesively bonded together under at least one of heat and pressure.

BRIEF DESCRIPTION OF THE DRAWINGS

Preferred features of the present invention are disclosed in the accompanying drawings, which are not to scale, wherein similar reference characters denote similar elements throughout the several views, and wherein.

DETAILED DESCRIPTION OF PREFERRED EMBODIMENTS

Figure 1:
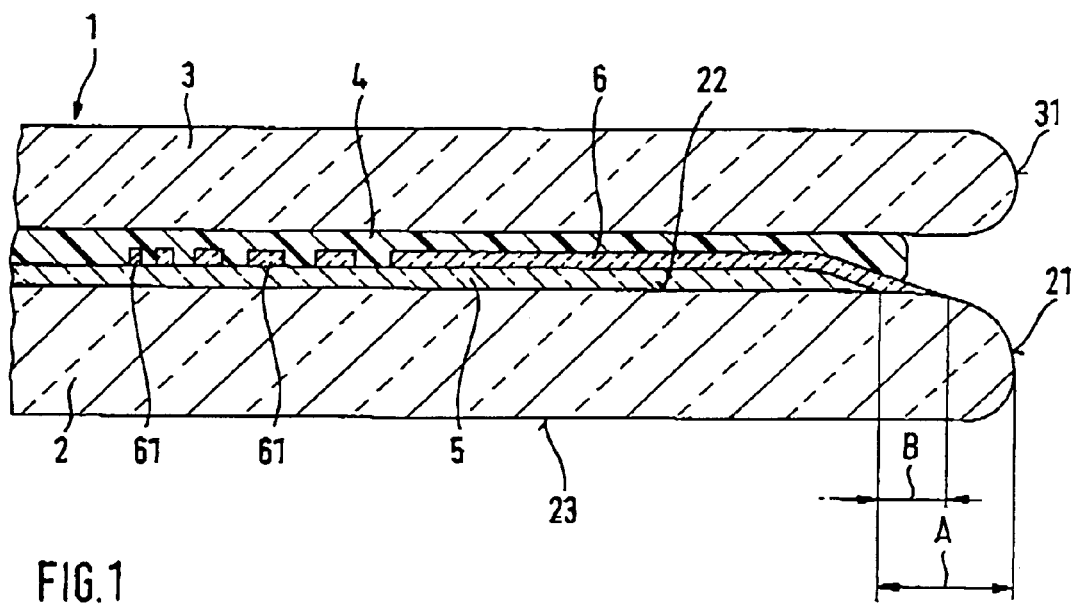
FIG. 1 shows a cross-sectional side view of a laminated glazing unit with a transparent surface coating and an opaque decorative frame in the edge region.

The invention is related to a process for manufacturing a laminated glazing unit including at least two panes, one of which is provided on its surface facing the inside of the composite with a corrosion-protected transparent surface coating and with layers of adhesive joining the respective panes together. The steps of the process include:

removing the transparent surface coating along at least one edge of the coated pane in a region lying between 0.1 mm and 5 mm from the peripheral edge of the pane in the direction of the main surface of the pane;

applying a protective layer that is impermeable to the diffusion of water vapor and covers the external boundary edge of the transparent surface coating along that edge of the coated pane from which the coating has been stripped;

joining the panes together by inserting each time a layer of adhesive in a manner known per se in order to form a laminated glazing unit.

Thus, with the process according to the present invention, the transparent surface coating applied over the entire main surface of a pane is removed in the region of the peripheral edge of the pane. Subsequently, a coating impermeable to the diffusion of water vapor is applied, with the coating being placed in such a way that it covers the transition region between the coated and uncoated parts of the main surface of the pane. After the panes have been assembled, the surface coating lies within the composite and is no longer covered in its peripheral region by the water-vapor-impermeable coating. The surface coating also is protected against corrosive media present in the environment, which could penetrate the laminated glazing unit via the edge. The transparent surface coating may be removed very easily by an abrasion treatment process, such as grinding or polishing.

In a preferred process according to the present invention, the surface coating is removed at the same time as the peripheral edges of the panes are being treated. In particular, when the coated pane is made of glass, for example, a grinding treatment is often necessary at the peripheral edges in order to prepare for other steps in the process such as a heat treatment or surface printing. Also, it is often sufficient simply to grind the edges, in order to prevent cutting injuries. Tools suitable for such treatment include grinding wheels with profiles configured for grinding the peripheral edge and part of the surface of the coated pane in a single operation. Such a grinding wheel has a generally C-shaped recess which may, for example, be formed perpendicular to its axis of rotation and asymmetrically so that one branch of the C extends over the coated main surface of the pane by a defined amount. The surface of the pane comes into contact with the grinding wheel in a region which extends between 0.1 mm and 5 mm from the peripheral edge in the direction of the main surface of the pane, thereby removing the surface layer by abrasion. To assure that the transparent surface coating has been completely removed, a treatment of the pane itself, near the surface, may be carried out beneath the surface coating. Depending on the type of the following procedures, it is preferred that a gentle transition is obtained without the formation of steps between the ground and unground surfaces of the pane. In general, the surface of the uncoated region of the main surface of the pane joins the surface of the coated region while making an angle of between 180° and 190°.

In one preferred process according to the present invention, the protective layer is formed of an organic compound. However, in this case it is necessary that the compound is both impermeable to the diffusion of water vapor and meets all the respective requirements of long-term resistance and durability.

If the coated panel is formed of a material resistant to high temperature, as is the case for example with glass panes, the protective layer covering the peripheral region of the boundary edge of the corrodable transparent surface coating may also be formed of a bakable ceramic paint. In order for such a bakable ceramic paint to bond lastingly to the glass pane, it must be subjected to a heat treatment—the baking.

The protective layer may completely cover the main surface of the pane provided with the transparent surface coating, or it may be designed in the shape of a frame. In the frame-shaped configuration, the protective layer may serve at the same time as a decorative frame if it is not transparent, such as opaque. Such a frame-shaped opaque coating often also has a technical function, namely to conceal from view the other structural elements such as fastening devices, electrical construction elements, etc. If the finished laminated glazing unit is adhesively bonded to another component, another function of the frame-shaped protective layer is to protect the adhesive layer from UV radiation, which would damage it.

When a curved laminated glazing unit contains at least one curved glass pane, the transparent surface coating generally lies on this glass pane. The transparent surface coating therefore may be applied to the already finished, curved glass pane using reactive sputtering, for example. Finally, the removal of the surface coating by abrasion necessarily is carried out on the already-formed curved pane, and the protective layer is also applied to the curved pane. For industrial-scale manufacture, it is recommended to automate these two process steps. However, because of the space requirements of the treatment passes, complex machines having many axes of movement and associated controls may be needed for such automation.

Alternatively, the automation may be carried out considerably more simply if the transparent surface coating is deposited on the still-flat, uncurved glass pane and the following treatment—removal of the coating from the edge and application of the protective layer—also is carried out on the flat pane. Any treatment by hand is also easier to perform on a flat pane and there is little risk of handling errors. If the aforementioned process steps are carried out on a flat glass pane, the transparent surface coating may be applied directly to the preform instead of being applied to the glass pane already cut to its external dimensions. During industrial-scale manufacture of glass using the float process the transparent surface coating, for example, is deposited, relatively easily, directly on the continuous glass ribbon that is produced, or on large sheets of glass having dimensions of about 3 m by 6 m in what is called a batch coater. This obviates the time consuming task of inserting a number of glass panes already cut to the finished dimensions into the coating plant. One condition for depositing the transparent surface coating on a flat glass pane, however, is that multilayer film systems be used that will not be damaged by any necessary heat treatment, such as the baking of the protective layer or the bending of a glass pane.

Turning to the figures, FIG. 1 shows the construction of a curved laminated glazing unit 1, illustrated in flat form for the sake of simplicity. Such a laminated glazing unit 1, for example, may be used as a windscreen in the body opening of a vehicle. Glazing unit 1 includes a glass pane 2 facing towards an internal space, a glass pane 3 facing towards the outside, and an adhesive layer 4 joining the two glass panes 2, 3 together. Films of a synthetic thermoplastic, for example a polyvinyl butyral (PVB) available under the name SOLUTIA 3G-FOLIE, preferably are used as adhesive layer 4.

In a preferred embodiment, glass pane 2 is covered over substantially an entire surface with a surface coating 5 which is transparent, such that essentially the visible light is permitted to pass through but infrared radiation is reflected. Preferably, surface coating 5 is a thin, multilayer film system having two functional layers made of silver, as well as stop and antireflection dielectric layers which are placed above, below and between the silver layers.

Figure 2:
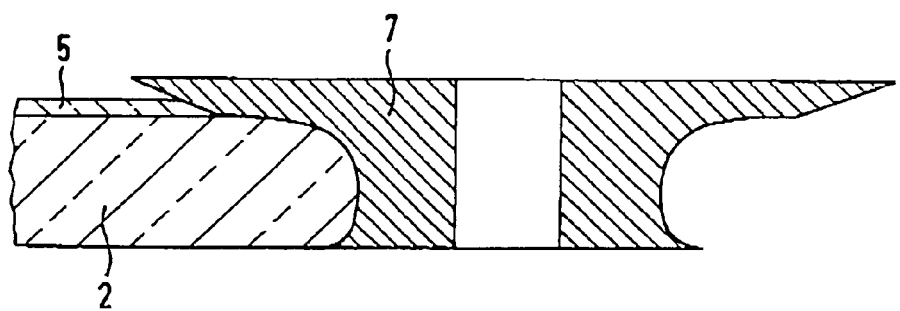
FIG. 2 shows a cross-sectional side view of the profile of a grinding tool for carrying out the process according to the invention.

Before glass panes 2, 3 are joined together by inserting adhesive layer 4, according to a process known per se, by applying heat and/or pressure to laminated glazing unit 1, a grinding treatment is firstly carried out on its respective peripheral edges 21 and 31. Preferably, peripheral edge 31 of the glass pane 3 is given a so-called C profile, as is usual in the industrial technique of glass treatment. On the other hand, peripheral edge 21 of glass pane 2 is provided with a modified, asymmetrical C-shaped profile. Thus, the ground region extends further from the edge on the main coated surface 22 than on the other main surface. In this case, the opening of the C is dimensioned in such a way that surface coating 5 is removed by abrasion in the region A during the grinding procedure. A grinding tool 7 suitable for the grinding procedure thus described is shown in FIG. 2 with respect to glass pane 2 and surface coating 5.

After the peripheral edges of glass panes 2, 3 have been treated, a frame-shaped opaque protective layer 6 is applied along the peripheral edges of glass pane 2. The decorative frame formed by protective layer 6 gradually changes, in the direction from the peripheral edges towards the center of the pane, into a pattern of dots 61. Protective layer 6 extends in the direction from peripheral edge 21 over a distance in a region B of about 0.5 mm to 1 mm, and such that it covers surface coating 5. The region B also may extend beyond the projection of the terminal edge of the branch of the C-shaped peripheral edge facing the main surface 23. Protective layer 6 preferably is formed of a bakable ceramic paint colored with black pigments such as enamel paint 249004 available from the company $DMC^2$, and preferably is printed by the process of screen printing. After printing, the bakable ceramic paint is dried at about 100° C. and is then baked at about 620° C. When it is desired to manufacture a curved laminated glazing unit, glass panes 2, 3 may be shaped using a process known in the art, for example a bending process using a skeleton.

After the bending operation, adhesive film 4, which may be a thermoplastic, may be inserted between glass panes 2, 3 and final assembly may be carried out by applying heat and/or pressure in order to form laminated glazing unit 1.

It is also possible to use the surface coating as a means of heating the pane. In this case, at least two current-collecting tracks must be placed on the coating. A standard manufacturing process for forming these current-collecting tracks is the screen-printing of an electrically conducting, bakable paint directly on the surface coating. When it is desired to place the current-collecting tracks in the peripheral region of the pane, the protective layer is printed on the collecting tracks. However, in this case it is necessary to provide a predetermined number of windows in the protective layer. The collecting track is accessible through these windows in order to make contact with an electrical voltage supply, for example by soldering a connection cable. If the windows detract from the optical appearance of the laminated glazing unit, the second pane may be provided with a frame-shaped additional decorative layer which is visible, because of the transparency, through the laminated glazing unit in the projection on the protective layer.

Application of the surface coating with its protective layer is not limited to the pane facing the interior of the vehicle since it is also conceivable to provide the pane facing the outside with the surface coating, or to join other panes or films to the said panes, so that the coated pane lies on the inside of an assembly of more than two panes.

The material for the adhesive layer preferably is chosen to provide not only long-term stability and transparency, but also good adhesion to all the surfaces to which it is joined—the material of the panes, more particularly the glass, the transparent surface coating, and the protective layer.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A process for manufacturing a laminated glazing unit having at least two panes forming a composite with an inside and an outside, a first coated pane being provided on a surface facing the inside of the composite with a corrosion protected transparent surface coating and at least one adhesive layer for coupling the panes together, the process comprising:
removing the transparent surface coating proximate at least one edge of the coated pane to create an exposed region between about 0.1 mm and about 5 mm from a peripheral edge of the pane along a main surface of the pane;
applying an opaque protective layer proximate the peripheral edge of the coated pane after removal of the transparent surface coating therefrom, the protective layer being substantially impermeable to diffusion of water vapor and covering at least a portion of the exposed region of the coated pane and extending across a portion of the transparent surface coating beyond an edge thereof proximate the peripheral edge of the pane;
coupling the panes together with an adhesive layer disposed therebetween to form the laminated glazing unit.

2. The process of claim 1, wherein the protective layer covering the edge of the transparent surface coating is an organic coating.

3. The process of claim 1, wherein at least one of the panes comprises curved glass formed by bending, the curved glass being provided with the transparent surface coating prior to bending.

4. The process of claim 1, wherein the transparent surface coating is removed along the edge of the coated pane by abrasion.

5. The process of claim 4, wherein the surface coating is removed by abrasion substantially simultaneously with a grinding treatment for grinding the peripheral edge.

6. The process of claim 1, wherein the protective layer covering the edge of the transparent surface coating is a bakable ceramic paint.

7. The process of claim 6, wherein the protective layer covers substantially the entire main surface of the coated pane provided with the transparent surface coating.

8. The process of claim 6, wherein the protective layer covering the edge of the transparent surface coating is in the form of a frame.

9. The process of claim 6, further comprising baking the ceramic paint, wherein at least one of the panes including the coated pane is formed of glass.

10. A process for manufacturing a laminated glazing unit having at least two panes forming a composite with an inside and an outside, the process comprising:
applying a transparent surface coating to a first pane along substantially an entire main surface facing the inside of the composite;
removing the transparent surface coating proximate at least one peripheral edge of the first pane to create an exposed region of the main surface of the pane;
applying a ceramic protective coating proximate the peripheral edge of the first pane after removal of the transparent surface coating therefrom, the protective coating being substantially impermeable to diffusion of water vapor and covering at least a portion of the exposed region of the first pane and extending across a portion of the transparent surface coating beyond an edge thereof proximate the at least one peripheral edge of the pane;
bonding the panes together to form the laminated glazing unit.

11. The process of claim 10, wherein the panes are adhesively bonded together under at least one of heat and pressure.

12. The process of claim 10, further comprising bending at least one pane.

13. A process for manufacturing a laminated glazing unit from a pair of glass panes, the process comprising:
grinding a peripheral edge on each of the glass panes;
disposing a transparent surface coating, an opaque ceramic protective layer and an adhesive layer between the glass panes, with (1) the transparent surface coating disposed between the opaque protective layer and one of the glass panes and (2) the opaque protective layer disposed between the adhesive layer and the transparent surface coating;
covering at least a portion of a main surface of one of the glass panes with the protective layer, with the protective layer also extending across a portion of the transparent surface coating beyond an edge thereof proximate the peripheral edge of the glass pane.

14. A laminated glazing unit comprising at least two panes coupled together by an adhesive layer disposed therebetween to form a composite with an inside and an outside, a first coated pane provided on a surface facing the inside of the composite with a transparent surface coating, the transparent surface coating being spaced from at least one edge of the main surface of the coated pane by a distance between about 0.1 mm and about 5 mm, and a transition region extending between coated and uncoated regions of the main surface of the pane being covered with a protective layer impermeable to diffusion of water vapor.

15. The laminated glazing unit of claim 14, wherein the protective layer is disposed at an angle of between about 180° and about 190° in the transition region extending between coated and uncoated regions of the main surface.

16. The laminated glazing unit of claim 14, wherein the transparent surface coating comprises at least one of silver and an antireflection dielectric.

17. The laminated glazing unit of claim 14, wherein the transparent surface coating comprises a silver layer abutting an antireflection dielectric layer.

18. The laminated glazing unit of claim 14, wherein the adhesive layer comprises a synthetic thermoplastic.

19. The laminated glazing unit of claim 14, wherein the protective layer is a bakable paint.

20. The laminated glazing unit of claim 19, wherein the bakable paint is electrically conducting.

21. A laminated glazing unit comprising:
a pair of glass panes, each of the panes having a ground peripheral edge;
a transparent surface coating;
an opaque protective layer substantially impermeable to diffusion of water vapor; and
an adhesive layer;
wherein the protective layer covers at least a portion of a main surface of one of the panes and extends across a portion of the transparent surface coating beyond an edge thereof proximate an edge of the pane; and
wherein (1) the transparent surface coating is disposed between the opaque protective layer and one of the glass panes, (2) the opaque protective layer is disposed between the adhesive layer and the transparent surface coating, and (3) the transparent surface coating, opaque protective layer, and adhesive layer are disposed between the glass panes.

* * * * *